(No Model.)
W. H. WELLS.
DEVICE FOR RAISING CREAM FROM MILK.
No. 405,975. Patented June 25, 1889.
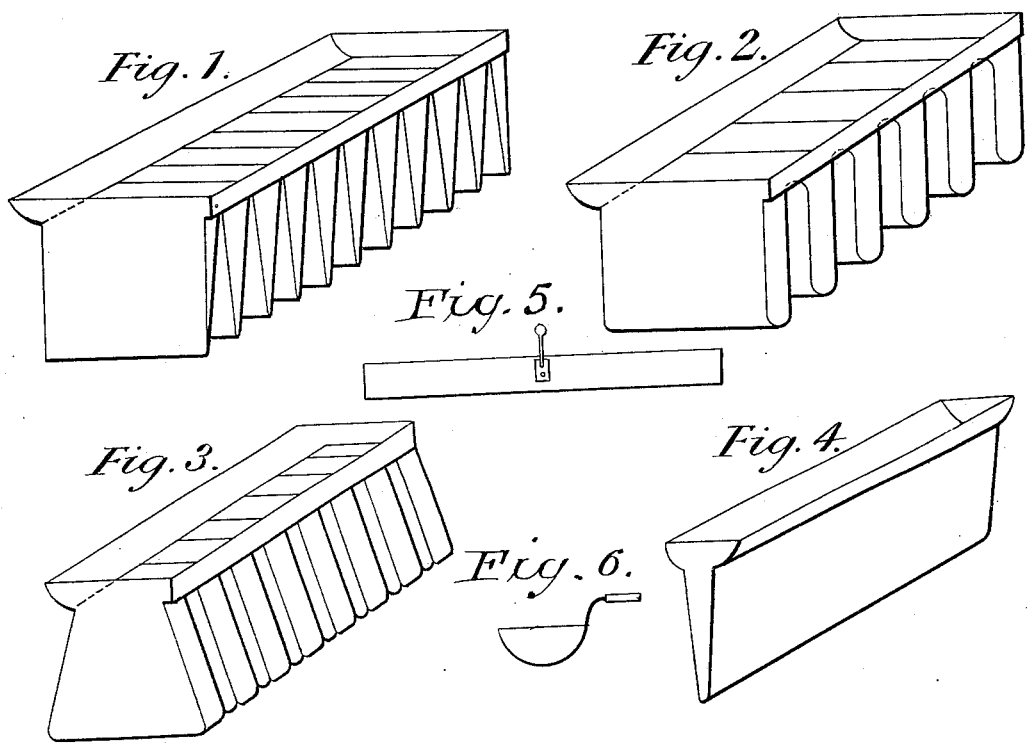
Witnesses
Lloyd B. Wight
Baltus DeLong
Inventor
William Howley Wells
By his Attys
Baldwin Davidson & Wight

United States Patent Office.

WILLIAM HOWLEY WELLS, OF EVERSHOT, COUNTY OF DORSET, ENGLAND.

DEVICE FOR RAISING CREAM FROM MILK.

SPECIFICATION forming part of Letters Patent No. 405,975, dated June 25, 1889.

Application filed November 5, 1888. Serial No. 290,014. (No model.) Patented in England September 12, 1888, No. 13,216; in France October 29, 1888, No. 193,797; in Belgium October 30, 1888, No. 83,776; in Canada December 26, 1888, No. 30,485, and in Italy December 31, 1888, No. 24,387.

*To all whom it may concern:*

Be it known that I, WILLIAM HOWLEY WELLS, a subject of the Queen of Great Britain, residing at Evershot, in the county of Dorset, England, have invented certain new and useful Improvements in Apparatus for Raising Cream from Milk and for Skimming, (for which I have received Letters Patent in England, No. 13,216, dated September 12, 1888; in France, No. 193,797, dated October 29, 1888; in Belgium, No. 83,776, dated October 30, 1888; in Italy, No. 24,387, dated December 31, 1888, and in Canada, No. 30,485, dated December 26, 1888,) of which the following is a specification.

The object of this invention is to so form vessels in which milk is to be set to allow cream to rise that the raising of the cream may be effected, and also, in addition, to so form them that the cream, when it has risen, can be skimmed or cut off bodily from the skim-milk. The raising of cream is quickly and efficiently effected if the vessel in which the milk is set be so formed that the cooling of the milk may take place through a large area of cooling-surface so disposed that all the spaces occupied by the milk are narrow. By making the spaces within which the milk is contained sufficiently narrow the raising of cream may be effected in one hour or less without any artificial cooling by ice or stream of cold water; but it is desirable to so proportion the width of the spaces occupied by the milk that the raising of the cream may be effected, say, in about three hours. I form vessels to effect the raising of cream in the above manner comparatively deep, with the lower part either one narrow cell or divided into two or more narrow cells, and with a cream reservoir or receptacle at the top into which the cream can rise from all the cells. Such cream-reservoir I make with parallel sides and ends. The two ends I make vertical, and one or both of the sides I make curved, as hereinafter explained, to allow of a skimming-scoop of the full length of the cream-reservoir being inserted down one of such curved sides and across the top of the reservoir, so that all the cream may be removed by one insertion of the skimmer. The vessels may be of a great variety of forms. Various forms suitable for the purpose are shown in the drawings hereunto annexed; but I do not restrict my claim to these forms.

In Figures 1, 2, and 3 I have shown examples of vessels formed of a number of parallel deep and long but narrow cells, all opening at the top into one shallow cream-reservoir. In Fig. 1 each cell is shown to be tapering or wedge-shaped. In Fig. 2 the sides of the cells are vertical and rounded at top and bottom. In Fig. 3 they are of similar construction, but of greater length at the bottom than at the top. At Fig. 4 I have shown a single cell rising into a cream-reservoir. If such cells were used, they might either be formed with a foot to rest on, or more conveniently, a number of them might be placed side by side into the spaces of a rack or holder. Figs. 5 and 6 show a skimmer suitable for removing the cream from the cream-reservoir.

The shallow cream reservoir or receptacle at the top of the vessels I form, as above explained, with parallel sides and ends. The ends I make vertical, as shown, while one or both of the sides are curved, so that the whole of the cream collected in the reservoir may be removed by one insertion of a suitable skimmer.

When using vessels formed as hereinbefore described for cream-raising, the milk while still warm should be filled into the vessels until it partially fills the cream-reservoir at the top, and should then be allowed to remain at rest. When the cream layer has been allowed to collect in the cream reservoir or receptacle at the top, the edge of a curved skimmer equal in length to the length of the reservoir is placed against the top edge of one side of this reservoir and the skimmer moved downward into the reservoir, and in this way the whole of the cream in the reservoir may be at once collected in the skimmer and separated from the skim-milk. Before introducing the skimmer into the reservoir the liquid-level in the reservoir can be so adjusted that the reservoir contains little else than cream. If the liquid-level is too high, some liquid can be drawn off, or if too low liquid can be added quietly.

Having now particularly described and ascertained the nature of my said invention and in what manner the same is to be performed, I declare that what I claim is—

1. A vessel in which milk is to be set to effect the raising of cream, formed with narrow parallel cells all opening at the top into one shallow cream reservoir or receptacle, two ends of which are vertical and parallel with each other, and one or both sides of which are curved or inclined outwardly from one end piece to the other to allow of a skimmer being inserted at the curved side and passed across the bottom of the cream reservoir or receptacle to remove at one operation all the cream from the milk below it.

2. The combination, substantially as hereinbefore set forth, of a narrow vertical cell and a shallow horizontal cream reservoir or receptacle above the cell, said cream-receptacle having vertical parallel end pieces, and having one or both of its sides curved outwardly and extending from one end piece to the other, for the purpose specified.

WILLIAM HOWLEY WELLS.

Witnesses:
ALF RAYNER,
CHAS. BROWN.